United States Patent
Johst et al.

(10) Patent No.: US 9,212,651 B2
(45) Date of Patent: Dec. 15, 2015

(54) BOLT TIGHTENING ROBOT FOR WIND TURBINES

(71) Applicants: Kenneth Johst, Frederiksberg C (DK); Lars Jagd, Malmö (SE); Jonas Bovin, Virum (DK); Gerald Marinitsch, Kalsdorf (AT)

(72) Inventors: Kenneth Johst, Frederiksberg C (DK); Lars Jagd, Malmö (SE); Jonas Bovin, Virum (DK); Gerald Marinitsch, Kalsdorf (AT)

( * ) Notice: Subject to any disclaimer, the term of this patent is extended or adjusted under 35 U.S.C. 154(b) by 0 days.

(21) Appl. No.: 14/365,928

(22) PCT Filed: Dec. 11, 2012

(86) PCT No.: PCT/EP2012/075052
§ 371 (c)(1),
(2) Date: Jun. 16, 2014

(87) PCT Pub. No.: WO2013/092291
PCT Pub. Date: Jun. 27, 2013

(65) Prior Publication Data
US 2014/0350724 A1  Nov. 27, 2014

(30) Foreign Application Priority Data
Dec. 21, 2011 (EP) .................................. 11194856

(51) Int. Cl.
*F03D 1/00* (2006.01)
*F03D 11/04* (2006.01)
*B25J 9/16* (2006.01)

(52) U.S. Cl.
CPC .............. *F03D 1/001* (2013.01); *B25J 9/1633* (2013.01); *F03D 11/04* (2013.01); *F05B 2230/50* (2013.01); *F05B 2240/912* (2013.01); *F05B 2260/301* (2013.01); *Y02E 10/728* (2013.01)

(58) Field of Classification Search
CPC ........ F03D 1/001; F03D 11/04; B25J 9/1633; F05B 2230/50; F05B 2240/912; F05B 2260/301; Y02E 10/728
See application file for complete search history.

(56) References Cited

U.S. PATENT DOCUMENTS

| | | | |
|---|---|---|---|
| 8,640,558 B2* | 2/2014 | Cabuz | 73/865.8 |
| 8,763,469 B2* | 7/2014 | Knoop et al. | 73/761 |
| 2008/0308696 A1* | 12/2008 | Kristensen | 248/230.1 |
| 2013/0289769 A1* | 10/2013 | Park et al. | 700/259 |

FOREIGN PATENT DOCUMENTS

| DE | 10 2008 016925 | 10/2009 |
|---|---|---|
| WO | WO 2009/132659 A2 | 11/2009 |

OTHER PUBLICATIONS

PCT/EP2012/075052, Mar. 15, 2013, International Search Report and Written Opinion.

* cited by examiner

*Primary Examiner* — Nicholas Kiswanto
(74) *Attorney, Agent, or Firm* — Workman Nydegger

(57) ABSTRACT

A robot to bolt down a series of nut bolts in a joint circular flange connection of a wind turbine, which robot comprises at least two wheels and a drive to transport the robot along the series of nut bolts and a tool to bolt down a nut bolt with a predefined torque and a position sensor to position the tool above the nut bolt to be bolted down and a robot control system to control the tightening process and document parameters relevant for the stability of each bolted down nut bolt.

9 Claims, 2 Drawing Sheets

BOLT TIGHTENING ROBOT FOR WIND TURBINES

CROSS REFERENCE TO RELATED APPLICATIONS

This application is a U.S. Nationalization of PCT Application Number PCT/EP2012/075052, filed on Dec. 11, 2012, which claims priority to European Patent Application No. 11194856.8, filed on Dec. 21, 2011, the entireties of which are incorporated herein by reference.

FIELD OF THE INVENTION

The present invention generally relates to a robot to bolt down a series of nut bolts in a joint circular flange connection of a wind turbine.

The present invention furthermore relates to a method to bolt down a series of nut bolts in a joint circular flange connection of a wind turbine.

BACKGROUND OF THE INVENTION

A wind turbine 1 as shown in FIG. 1 consists of several large single parts that are each preassembled at a factory workshop. A tower 2 of the wind turbine 1 can reach a height of 100 meters or 150 meters or even more and typically consists of tube segments 3 with a length of for instance 20 meters or 30 meters with circular flange connections on each side of the tube segments 3. During erection of the wind turbine 1 on site, the tube segments 3 are fitted together and connected with the joint circular flange connections with bolts and nut bolts. Large quantities of bolts, typically in the hundreds, of large size are necessary to establish the required stiffness and strength of the connections. In order to achieve the appropriate defined stiffness and strength in the joints all the bolts have to be bolted down with a predefined preload or torque.

During the erection of the wind turbine the bolt nuts are today typically applied and pretightened manually. This is followed by a manual procedure that applies the specified preload to the nut bolts. During this procedure a hydraulic high torque wrench is typically used. Several factors or parameters influence the quality of the tightening process, including the temperature of the working environment, the temperature of the hydraulic fluid, and the available oil pressure that is supplied to the hydraulic torque wrench.

The tightening of every bolt is typically done manually and a high level of quality is needed in order to ensure the stiffness and strength of the wind turbine. The tightening process is a very risky job that can take up to several days for one wind turbine 1. In case that the tower 2 of the wind turbine 1 collapses, possibly years after it was erected, it is difficult to analyze the causes of such an accident and to document whether the bolts were tightened according to the specifications prior to the collapse.

The invention is further seeking to alleviate the physical deterioration and work related illnesses that the monotonous and repetitive job with vibrating equipment is resulting in.

SUMMARY OF THE INVENTION

It is an objective of the presented invention to provide a robot to bolt down a series of nut bolts in a joint circular flange connection of a wind turbine that avoids the drawbacks of the known manual way of working.

This objective is achieved with a robot that comprises a drive to transport the robot along the series of nut bolts and a tool to bolt down a nut bolt with a predefined torque and a position sensor to position the tool above the nut bolt to be bolted down and a robot control system to control the tightening process and to store parameters to document the bolted down nut bolts.

It is furthermore an objective of the presented invention to provide a method to bolt down such nut bolts that avoids the drawbacks of the known manual way of working.

This objective is achieved with a method that comprises the following steps: Position a nut bolt on each bolt of the joint circular flange connection; Position a robot according to any of the claims 1 to 7 on the joint circular flange connection and initiate the robot control system to tighten the nut bolts in a predefined sequence and/or with a predefined torque and to store parameters to document the bolted down nut bolts.

The bolt tightening robot and method according to the invention comprises the advantage that all bolts and nut bolts that connect different parts of the wind turbine can be tightened fully automatically with the requested preload. The automation of the robot further provides a complete documentation of the tightening process.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 2:
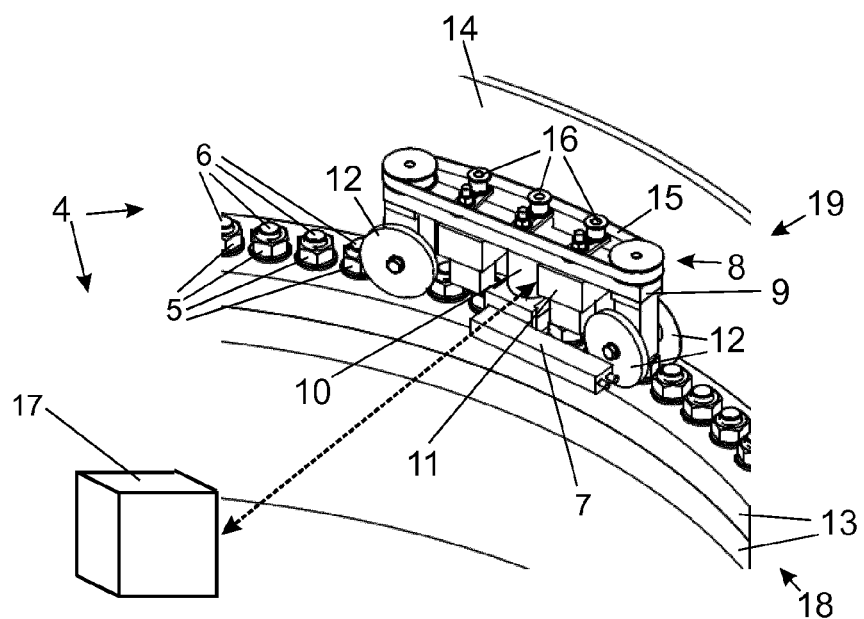
FIG. 2 is a perspective view of a bolt tightening robot.

FIG. 2 is a perspective view of a bolt tightening robot 4 to bolt down a series of nut bolts 5 with bolts 6 in a joint circular flange connection 18 of the wind turbine 1. At least one of the two following methods can be used to bolt down the nut bolts 5 with a preferred preload or predefined torque.

Method 1—Stretching the Bolt

In this method the tension to the bolt 6 is applied by an elongation of the bolt 6, which is an ordinary threaded bolt (no extension bolts) according to needed specifications. Therefore a hydraulic tensioning device is used. A clamp which fits the threaded portion of the bolt 6 or stud establishes a stiff connection to the bolt 6. A hydraulic ram that acts as a puller is connected to the clamp. Hydraulic oil from a small pump acts upon the hydraulic ram which in turn acts upon the puller. This is transmitted to the bolt 6 resulting in extension occurring. The tension, elongation in the bolt 6 is effectively controlled by the hydraulic pressure. In fact the tension is proportional to the hydraulic pressure and the designed pressure ratio in the ram. While the force is applied to the end of the bolt 6, the nut bolt 5 can then be rotated until a slight defined torque can be measured. A small amount of preload reduction might occur when the pressure is removed as the nut bolt 5 elastically deforms under the load. Due to the low well defined torque on the nut bolt 5 the reduction of preload can be kept in a very small range.

Further the average reduction of preload can be determined for each joint connection, that is defined by the bolts, nuts and flanges used in the joint, during a calibration test. Such a calibration test is for instance a Skidmore test, where a bolt equal to the bolts used in the junction is bolted down on a special Skidmore device using the same torque and the same tool as used in the junction. The Skidmore bolt tension calibrator is a hydraulic load cell used to determine the tension in a bolt or other threaded fasteners. The tension in the bolt compresses fluid in a hydraulic cylinder. A pressure gauge connected to the cylinder is then calibrated to read in terms of force rather than pressure. Consequently, if the robot 4 would use this method to bolt down nut bolts it would be ensured that the uncertainness with regard to the mounting of the bolt with nut bolt connection is kept at a minimum.

Method 2—Using a Torque Wrench:

In this method the tension to the bolt 6 is applied by torque on the nut bolt 5 with the threat in the nut bolt 5 introducing tension of the bolt 6. The nominal torque necessary to tighten the nut bolt 5 to a given preload can be determined either from tables, or, by calculation using a relationship between torque and the resulting bolt tension. The required torque, determined according to above mentioned procedure, will be taken as a set point for the conventional torque wrench. Such torque wrenches are usually hydraulically driven, wherein a hydraulic pump will give over a defined ratio the needed torque to the nut bolt 5.

It has to be considered that the majority of the torque is used to overcome friction between the washer, the nut bolt 5 and the bolt 6 (usually between 85% and 95% of the applied torque), slight variations in the frictional conditions can lead to significant changes in the tension (preload) of the bolt 6. Usually this effect can be reduced by the use of so called friction stabilizers. These are substances which are coated onto the nut bolt 5 or onto the threat of the bolt 6. In case this method is used, it is normal procedure to make a calibration of the torque tool, by using equal bolt 6, washer and nut bolt 5 in a calibration test set up (Skidmore test).

Due to several influencing factors between torque and the corresponding tension on the bolt 6, method 1 is regarded to provide a higher quality and is therefore preferred.

Figure 1:
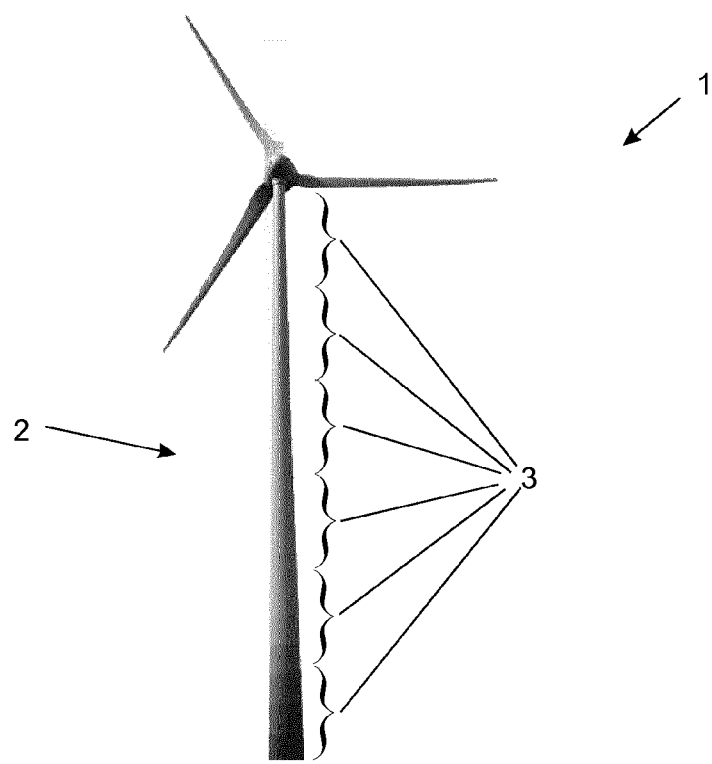
FIG. 1 shows a wind turbine with a tower built with tube segments.

The bolt tightening robot 4 according to the first embodiment of FIG. 2 is equipped with a torque wrench 7 (as described in method 2) ready for operation. The bolt tightening robot 4 furthermore comprises a drive 19 to transport the robot 4 along the series of nut bolts 5 which drive 19 comprises a belt drive 8. Further elements of the robot 4 are a base frame 9 and a clamp system 10 to mount the torque wrench 7. On the underside of the base frame 9 positioning sensors 11 and the wheels 12 of the drive 19 are placed. FIG. 1 furthermore shows the circular flanges 13 of the joint circular flange connection 18 and behind the robot 4 a metal wall 14 of the joint circular flange connection 18 of the tube segment 3.

The belt drive 8 is mounted on the top of the base frame 9 of the bolt tightening robot 4. A belt 15 of the belt drive 8 is equipped with several electromagnets (not shown). During a set-up procedure to adjust the robot 4 to the tube segments 3 the belt drive 8 is adjusted with three adjustable rollers 16 that ensure that the magnets touch the wall 14. As a result, one or more electromagnets are touching the wall 14 at any time. The touching electromagnets are activated and connect the robot 4 to the metal wall 14. This contact ensures the fastening of the robot 4. The movement of belt 15 drives the robot 4 to transport the robot 4 along the series of nut bolts 5.

On the base frame 9 the clamp system 10 is located. The clamp system 10 is adjustable and can be configured for different types of torque wrenches 7. The clamp system 10 is able to rotate the torque wrench 7 as well as to move the torque wrench 7 up and down. This is necessary in order to move the torque wrench 7 from one nut bolt 5 on to the next nut bolt 5 that has to be tightened. The rotation of the torque wrench 7 is necessary, since the orientation of the hex heads of the nut bolts 5 might change from one to the next nut bolt 5. When the torque wrench 7 is placed on the nut bolt 5 the torque wrench 7 can rotate free. This is possible due to the fact that the centre axis of the clamp system 10 has its rotation point exactly above the centre of the nut bolt 5 thus allowing a free rotation of the torque wrench 7 without a transfer of forces to the base frame 9 and the clamp system 10. During the tightening procedure the torque wrench 7 anchors against the wheels 12 or the flange 13.

The position sensors 11 are placed on the underside of the base frame 9. The position sensors 11 locate the position of the robot 4 in relation to the nut bolts 5 on the bolts 6 and provide sensor information to a robot control system 17 that controls the tightening process and store parameters that document that each bolted down nut bolt 5 has been mounted according to the specifications. The specifications used to bolt down the nut bolts 5 are influenced by the material (bolts 6 and nut bolts 5) used and by other factors (e.g. structural designer of the tower 2).

The robot control system 17 is realized by a computer and can either be placed (mounted) on the robot 4 or can be placed close to the joint connection 18. Between the robot 4 and the robot control system 17 a bus cable or a remote connection establishes the data transfer between the robot 4 and the robot control system 17. The electricity needed is, in both cases, supplied via a cable to the robot control system 17 and robot 4, since the robot 4 is not self sustaining. The robot control system 17 can be freely configured according to the needed method to bolt down the series of nut bolts 5. This allows the user to tighten the nut bolts 5 according to a specific pattern or predefined sequence as well as to tighten up one nut bolt 5 after the next in the row. Procedures to tighten up every nut bolt 5 two times can also be implemented in the robot control system 17. Besides the tightening of the nut bolts 5, the robot control system 17 records all necessary, user defined parameter to provide a user defined documentation of the tightening process of each nut bolt 5. The documentation is performed completely automatic and can be directly submitted via a Wifi connection to a complementary system. The documentation and progress of the tightening process can also be followed remotely.

The robot control system 17 tracks and documents all important parameters for each nut bolt 5. To enable this the robot control system 17 comprises the appropriate sensors to measure parameters and for instance document the ambient temperature, the temperature of the hydraulic oil of the torque wrench 7 as well as the oil pressure. Additional parameter/set points can be added to the documentation if required. The robot control system 17 also documents the bolt tightening procedure as explained above. The robot 4 is operating unmanned. This reduces the risk of an accident and increases the quality of the tightened nut bolts 5. In case of a failure during the tightening procedure the robot 4 can be configured to continue with the next nut bolt 5. A troubleshooting routine documents possible errors and will provide a protocol to the staff. The protocol can be viewed at the robot control system 17 of the robot 4 or could be sent automatically via a remote connection. This allows an efficient preparation as well as a very efficient troubleshooting and will accordingly reduce the time needed.

The dimension of the wheels 12 of the robot 4 are influenced by the dimension of the nut bolts 5 that are used in the joint circular flange connection 18. Depending on the size of the nut bolts 5 the geometry of the wheels 12 can either be adjusted or the wheels 12 can be exchanged. The wheels 12 furthermore are angled to each other in order to move the robot 4 around the bolt circle of the joint circular flange connection 18.

In another embodiment the drive to transport the robot could be realized by any other transportation mode like an electromotor that drives one or more of the wheels 12. The transportation could either be realized without wheels or with two, four or even more wheels. It would furthermore be possible to realize the drive with vacuum pads that connect to the wall 14.

Figure 3:
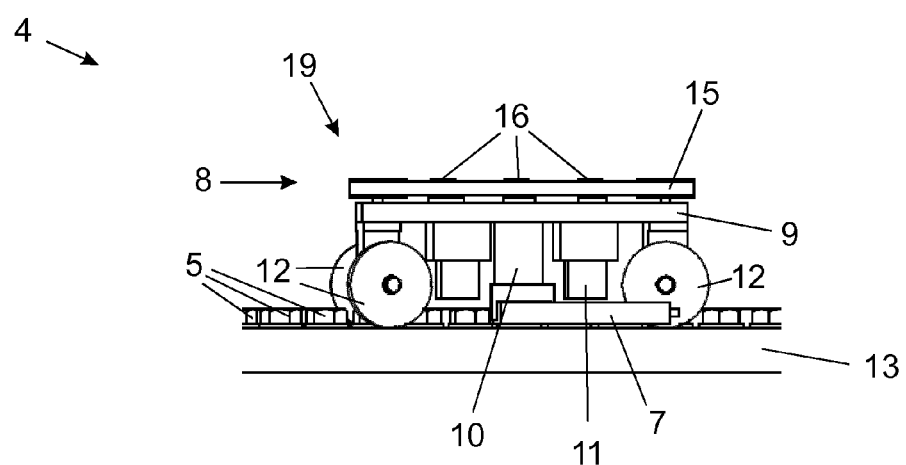
FIG. 3 is a front view of the bolt tightening robot of FIG. 2.
Figure 4:
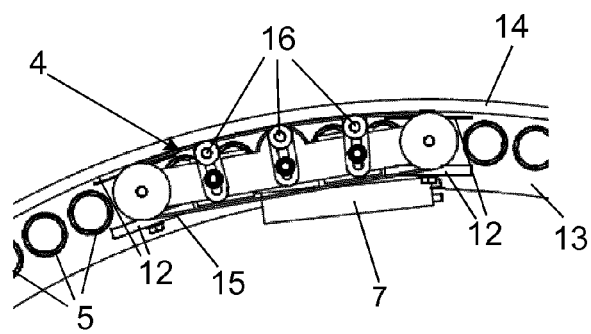
FIG. 4 is a top view of the bolt tightening robot of FIG. 2.

With the robot 4 the method to bolt down a series of nut bolts 5 in a joint circular flange connection 18 of a tube segment 3 of the wind turbine 1 is as simple as follows. A crane positions one tube segment 3 onto the other to erect the tower 2 and one of more workers position and pre-tighten the nut bolts 5 just to enable some provisional stability of the tower 2. After that the robot 4 is positioned on the joint circular flange 13 as shown in the FIGS. 2 to 4 and the robot control system 17 is initiated to start the procedure to bolt down the nut bolts 5. The sensors of the robot 4 measure all relevant parameters and document them. In order to check the correct function, this documentation may be reviewed in real time. Afterwards, it will be available to document that the wind turbine 1 has been erected according to the specifications. Further the documentation can not be manipulated nor altered but can be used to certify the actual conditions and the compliance with the give parameters.

The claimed robot to bolt down a series of nut bolts in a joint circular flange connection may be used for the same purpose in similar buildings as well. The robot for instance could be used to flange tube segments of a windmill or a tower used as antenna mast or look-out. For the wind turbine the robot can be used for tower and the blade torqueing process.

The term bolt down in the claims and description should be understood to cover the meaning of the terms tightening or torqueing or preload or pre-stress or screw down.

The robot according to the invention could be used for documentation purposes only for such towers 2 that have already been erected based on the manual procedure. In that case the robot would test already bolted down nut bolts to gather and store parameters about the bolted down nut bolts. These according to a specification documented parameters enable to come up with structural analyses for the tower.

The invention claimed is:

1. A robot to bolt down a series of nut bolts in a joint circular flange connection of a wind turbine, the robot comprising:
    a drive to transport the robot along the series of nut bolts; and
    a tool to bolt down a nut bolt with a predefined torque; and
    a position sensor to position the tool above the nut bolt to be bolted down; and
    a robot control system to control the tightening process and to store parameters to document the bolted down nut bolts.

2. The robot according to claim 1, wherein the robot control system stores parameters that document whether or not each bolted down nut bolt has been mounted according to a specification.

3. The robot according to claim 1, wherein the robot control system controls the robot to bolt down the nut bolts in the joint circular flange connection in a predefined sequence.

4. The robot according claim 1, wherein the drive of the robot comprises wheels that are angled to each other in order to move the robot around the series of nut bolts in the circle of the joint circular flange connection.

5. The robot according to claim 1, wherein the drive of the robot comprises a belt drive with magnets attached to the belt which magnets temporarily connect to the metal wall of the joint circular flange connection of the wind turbine to transport the robot.

6. The robot according to claim 5, wherein the belt drive comprises adjustable rollers for the belt to ensure that the magnets temporarily connect the circular metal wall.

7. The robot according to claim 1, wherein the tool to bolt down the nut bolts with a predefined torque uses either a bolt stretch method or is realized by a torque wrench and a clamp system.

8. A method to bolt down a series of nut bolts in a joint circular flange connection of a wind turbine, the method comprising:
    positioning a nut bolt on each bolt of the joint circular flange connection;
    positioning a robot according to claim 1 on the joint circular flange connection and initiating the robot control system to tighten the nut bolts in a predefined sequence and/or with a predefined torque and to store parameters to document the bolted down nut bolts.

9. The method according to claim 8, wherein the robot control system stores parameters that document whether or not each bolted down nut bolt has been mounted according to a specification.

* * * * *